(12) United States Patent
De La Nouvelle et al.

(10) Patent No.: US 9,633,648 B2
(45) Date of Patent: Apr. 25, 2017

(54) LOUDSPEAKER MEMBRANE AND METHOD FOR MANUFACTURING SUCH A MEMBRANE

(71) Applicant: FOCAL JMLAB, La Talaudiere (FR)

(72) Inventors: Bruno De La Nouvelle, Saint Genest Malifaux (FR); Shintaro Hosoi, Lyons (FR)

(73) Assignee: FOCAL JMLAB, La Talaudiere (FR)

( * ) Notice: Subject to any disclaimer, the term of this patent is extended or adjusted under 35 U.S.C. 154(b) by 0 days.

(21) Appl. No.: 14/650,727

(22) PCT Filed: Dec. 24, 2013

(86) PCT No.: PCT/FR2013/053266
§ 371 (c)(1),
(2) Date: Jun. 9, 2015

(87) PCT Pub. No.: WO2014/106713
PCT Pub. Date: Jul. 10, 2014

(65) Prior Publication Data
US 2015/0317972 A1    Nov. 5, 2015

(30) Foreign Application Priority Data
Jan. 7, 2013 (FR) .................................... 13 50116

(51) Int. Cl.
*H04R 7/10* (2006.01)
*G10K 13/00* (2006.01)
*B29C 70/40* (2006.01)
*H04R 7/12* (2006.01)
*B29L 31/34* (2006.01)

(52) U.S. Cl.
CPC .............. *G10K 13/00* (2013.01); *B29C 70/40* (2013.01); *H04R 7/125* (2013.01); *B29L 2031/3418* (2013.01); *H04R 2307/021* (2013.01); *H04R 2307/025* (2013.01); *H04R 2307/029* (2013.01); *Y10T 156/1044* (2015.01)

(58) Field of Classification Search
CPC .............. H04R 7/125; H04R 2307/021; H04R 2307/023; H04R 2307/025; H04R 2307/02
USPC ................... 181/167, 169, 170; 381/426, 428
See application file for complete search history.

(56) References Cited

U.S. PATENT DOCUMENTS

| | | |
|---|---|---|
| 6,378,649 B1 | 4/2002 | Inoue et al. |
| 2006/0281381 A1 | 12/2006 | Fujitani et al. |
| 2010/0288579 A1 | 11/2010 | Gerkinsmeyer |
| 2011/0305355 A1* | 12/2011 | Horigome ................ H04R 9/02 381/162 |

OTHER PUBLICATIONS

European Patent Office, International Search Report for Corresponding International Application No. PCT/FR2013/053266, date of mailing May 8, 2014 in the English and French Languages (4 pgs).

* cited by examiner

*Primary Examiner* — Jeremy Luks
(74) *Attorney, Agent, or Firm* — Harrus Beach PLLC

(57) ABSTRACT

The invention relates to a loudspeaker membrane having a sandwich structure, having a central web separating two layers of material based on high-rigidity threads impregnated with a polymer resin, characterized in that the central web is formed from a layer of material based on oriented natural fibers that are impregnated with a polymer resin.

8 Claims, 1 Drawing Sheet

LOUDSPEAKER MEMBRANE AND METHOD FOR MANUFACTURING SUCH A MEMBRANE

CROSS-REFERENCE TO RELATED APPLICATIONS

This application is a national stage application under 35 U.S.C. §371 of PCT Application No. PCT/FR2013/053266, filed on Dec. 24, 2013, which claims priority to and the benefit of French Application No. 1350116 filed on Jan. 7, 2013, which are incorporated herein by reference in their entirety.

TECHNICAL FIELD

The invention is part of the acoustic equipment domain, and more specifically, that of loudspeakers. It specifically aims to develop a new loudspeaker membrane structure that has multiple advantages in terms of acoustic performance and ease of manufacturing.

PRIOR ART

In general, the loudspeaker membranes form the moving part of a loudspeaker and ensure the movement of the surrounding air, which is necessary for creating sound waves.

Loudspeaker membranes are characterised by at least three mechanical parameters that affect the performance levels of the loudspeaker.

The first parameter concerns the rigidity of the membrane. The more rigid a membrane is, the less it can be deformed. Therefore, it acts as a piston that generates movements of the surrounding air mass with a motion that is true to the control signal. In other words, the more rigid a membrane is, the more it allows, especially at low frequencies, the operation of the piston that limits, or even completely eliminates, the phenomena of distortion, especially in the low frequency band.

The second critical parameter of a membrane concerns its mass. The lighter a membrane is, the more it can be moved at high frequencies with a satisfactory amplitude, with an energy level of constant activation. In other words, the lighter a membrane is, the more it allows greater acceleration, which allows it to reliably reproduce high frequencies without generating a tailing phenomenon at low audio frequencies.

Finally, the third critical parameter of a membrane concerns its sound damping, which is characterised by its mechanical Q-factor. Thus, the greater the damping, the lower the Q-factor and the more this membrane will play a neutral role, especially at intermediate frequencies, which will prevent the resonance frequency that is specific to the membrane from intermodulating with the reproduced signal. In other words, the more a membrane is damped, the more reliable its reproduction is.

Evidently, the ideal membrane is one that possesses a very high rigidity, while still being extremely light and highly damped. Currently, the materials that have been designed require compromises be made in favour of one or the other of these parameters, depending on the desired application.

Various solutions have already been suggested, each with their own advantages, but also with several drawbacks.

One solution consists of manufacturing membranes using a unique material, chosen for its high rigidity. This may be a metal, such as aluminium, or a composite material combining fibreglass or aramid fibre impregnated with an epoxy resin. The main drawback of these solutions resides in their relatively greater weight, which is necessary to obtain a satisfactory level of rigidity.

Moreover, in patent FR 2 615 345, a description was given of a membrane structure formed from a sandwich of two fibrous skins, placed on both sides of a thermosetting resin containing very highly rigid microscopic spheres, especially those made of glass. The presence of these microspheres increases the rigidity of the membrane, thus making it satisfactory for reproducing low frequency sounds. However, in practice, creating this type of membrane is a particularly delicate process and results in high rates of rejection due to non-compliance with the specifications.

Another solution has been described in document FR 2 731 579. The membranes described in this document are composed of a sandwich structure, which comprises a core made of a thermoformed foam, on both sides of which are applied textile sheets made of high-tenacity fibres, especially glass yarn impregnated with a thermosetting resin. A variant was described in document US 2010/0288579, in which the core was made from a nonwoven fabric of impregnated synthetic fibres. The use of sandwich structures, which combine two layers of high rigidity separated by a core, helps in increasing the level of rigidity of the membrane while keeping the weight constant, as compared to single-material solutions.

However, despite the advantages of these composite sandwich structures in terms of rigidity, there are several drawbacks to the manufacturing process, which is relatively complex and expensive. Effectively, to obtain a membrane with a well-defined geometric form, it is necessary to thermoform the foam that is used for the core of the membrane at a prior stage, and then apply the two skins made of textile sheets to it, before exposing the entire unit to a source of heat that will polymerise the resin impregnating the textile sheets. These operations, which must be conducted manually, can last for relatively long periods of time and require delicate handling.

Thus, one of the problems that the invention proposes to solve is that of providing a membrane which has high mechanical performance levels in rigidity, mass and damping and can be manufactured using a simple or even automated process.

DISCLOSURE OF THE INVENTION

The invention concerns a loudspeaker membrane with a sandwich structure that comprises a central core separating two outer layers of materials made of high-rigidity yarn, impregnated with a polymerised resin.

Pursuant to the invention, this membrane is characterised such that the central core is formed of a layer of material made of natural fibres oriented and impregnated with a polymerised resin.

In other words, the two outer skins of the membrane are separated by a layer made of natural fibres forming nearly parallel bundles which, due to their thickness, allow for enough distance between the two skins, thus achieving the desired rigidity.

In other words, the membrane is made of a laminate that mixes different types of fibres embedded in the same matrix. This structure has a density and Young's modulus gradient from the neutral fibre to the surface: the core of the laminate is light and damped. Its surface is rigid and the unit is perfectly joined in a common matrix. Due to this combination, it is possible to at least partially reconcile the paradoxical criteria of bending rigidity/low mass/high damping.

Even though it is greater in mass than the thermoformed foam used in the previous solutions, the membrane according to this invention has the major advantage of being created in a much simpler manner, as it does not require prior thermoforming. The core is shaped at the same time as the resin impregnating the skins is set. This shaping is helped along by the fact that the natural fibres of the central layer slide along the fibres of the skins when deformed from the plain configuration to the desired configuration.

Moreover, and unexpectedly, the Applicant observed that the use of oriented natural fibres, in the form of a unidirectional layer, does not induce any specific behaviour related to this orientation. On the contrary, it appears that the orthotropic nature of the skins covering the membrane, preferably made of a woven structure, may result in the vibratory coupling of normal modes when the membrane is excited mechanically. Also, it appears that the presence of oriented natural fibres, due to their somewhat irregular configuration, mitigate these coupling phenomena, thus improving the damping of the membrane.

In practice, the natural fibres used can be chosen from the group comprising flax, silk, hemp, ramie, coir, sisal, jute, bamboo or cotton, taken either individually or in combination. The natural fibres are preferably set in the form of parallel braids, unless they have been subjected to operations necessary for making them into yarn, such as downtwisting. The fibres are also preferably not treated chemically, and therefore are preferably not subjected to lubrication.

Preferably, the natural fibres are set in a unidirectional layer in which the different braids are placed parallel to each other, without bending or warp shrinkage, as opposed to a woven structure.

In practice, it is preferable that the outer layers forming the skins of the membrane be made of a woven structure, even if it is also possible to use non-woven structures.

According to a characteristic of the invention, the high-rigidity yarn, i.e. the yarn with a high Young's modulus, included in the outer layers can be of a material chosen from the group comprising glass, aramid and carbon, each of these materials being taken either individually or in combination with each other.

In practice, the use of resin-based impregnation is preferred, as it helps in obtaining a good level of rigidity. This is particularly the case in thermosetting resins and especially in epoxy resin.

In practice, the core made of natural fibres can have a thickness that ranges from a few tenths of a millimeter to a few millimeters, and is typically between 0.2 and 3 mm and preferably between 0.3 and 1 mm.

According to another aspect of the invention, this concerns the manufacturing process of a loudspeaker membrane. Pursuant to the invention, this process comprises the following stages:
  formation of a stack comprising:
    a first layer of material made of high-rigidity yarn;
    a core layer comprising a material made of oriented natural fibres;
    a second layer of material made of high-rigidity yarn;
  the shaping of the said stack by exposing it to a source of heat in order to polymerise a resin that is present in the said stack;
  the cutting of the shaped stack to match it to the desired contours of the membrane.

In other words, the process that complies with the invention has the advantage of allowing all of the layers constituting the sandwich structure to be shaped in a single stage, which greatly simplifies the manufacturing process.

Several variants can be planned as concerns the manner in which the impregnating resin is set in the different layers.

Thus, in one form of execution, the layers of the material made of high-rigidity yarn are impregnated with a polymer resin before the stack is formed. In other words, pre-impregnated skins are used, which can, in one preferred case, be impregnated with an excess quantity of resin which will then flow within the core layer during the shaping stage. In this case, the handling operations for the preparation are simplified, as the resin does not need to be drained off. It is also possible to use a core made of natural fibres which has been impregnated beforehand in a separate stage.

In another form of execution, the stack can be made using dry layers, provided that a polymer resin is deposited on the stack such that it impregnates all of the layers and becomes cross-linked during the shaping. In this case, the handling of the different materials is simple, as they are assembled in their dry forms.

A BRIEF DESCRIPTION OF THE FIGURES

The manner in which the invention is implemented, as well as the resulting advantages, is made known in the description of the method of implementation given below, in support of the appended figures, in which.

METHODS OF EXECUTING THE INVENTION

As previously explained, the membrane pursuant to the invention comprises a stack of several layers.

Figure 1:
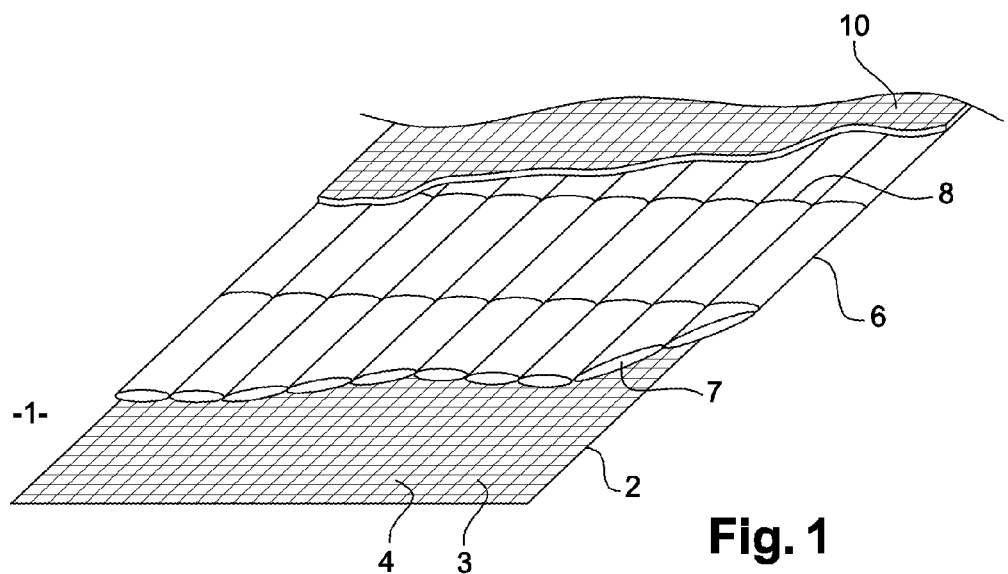
FIG. 1 is a schematic perspective view of a stack of different layers, shown partially cutaway, which help in creating the membrane that is compliant with the invention.

As illustrated in FIG. 1, this stack (1) comprises a first layer (2) that is made up of a fabric, typically made of glass yarn, and therefore comprising a crosswise grain (3) and a lengthwise grain (4) that cross each other perpendicularly.

For example, layer (2) of the glass yarn can have a mass of approximately 50 g/m$^2$, and be formed of yarn with a density of approximately 11 tex.

Of course, other materials such as carbon yarn or aramid yarn can be used, possibly even in combination with each other.

This stack (1) also comprises a layer (6) that is made of natural fibres in the form of a unidirectional structure. In this case, the different yarns (7) are positioned parallel to each other. They can be kept in place next to each other by different methods, especially via a very fine crosswise grain (8) that has a negligible influence on the properties of the layer forming the core. The influence of the crosswise grain (8) is low, but it is still preferable that it be positioned at 90° with respect to the high count yarn (7) in order to obtain a more homogeneous deformation.

For example, the yarn (7) of the core layer can be made of flax, in the form of braids or ribbons with a width of approximately one millimeter, forming a unidirectional layer with a mass of 150 to 400 g/m$^2$. This kind of layer has a thickness of approximately 0.2 to 3 mm. Preferably, the ribbons are obtained using flax fibre, which, after being gathered in strands, is carded and combed in order to orient the fibres in the preferred direction. It has been observed that these operations help in obtaining a relatively homogeneous orientation of the fibres while still maintaining the relatively greater thickness of the ribbon, and in obtaining a greater resistance to stretching in the direction of the ribbon. As compared to the traditional processes of treating flax fibres, this method avoids, as far as possible, the drawing operations that have a tendency to break the basic fibres. Similarly, and contrary to the classic method of packaging the flax strands, this method avoids operations of twisting, which, while increasing the ribbon's resistance to stretching, also have the tendency to reduce the thickness of the ribbon.

In the illustrated form, the yarn (7) of natural fibres is placed parallel to the yarn of the skins (2) that are made of glass yarn. In this configuration, a certain reduction has been observed in the coupling phenomena in the normal mode; this can be attributed to the relative irregularity of the geometry of the natural fibres as compared to the irregularity of the glass yarn forming the skin (2).

However, in other configurations, it is possible to give the natural fibres a position that is staggered with respect to that of the yarn of the skins.

This stack is completed by a second skin (10), which is similar (or even identical) to skin (2) and is located on the other side of the core layer (6).

In practice, when manufacturing a membrane, it is possible to first create the stack of the different layers and then cut the zones to dimensions that are slightly larger than those of the developed area of a membrane. Each of the subunits thus created is then coated in a resin that impregnates the skins (2, 10) as well as the core layer (6). The entire unit is then shaped under a hot press that ensures the cross-linking of the resin (in the case of a thermosetting resin).

Figure 2:
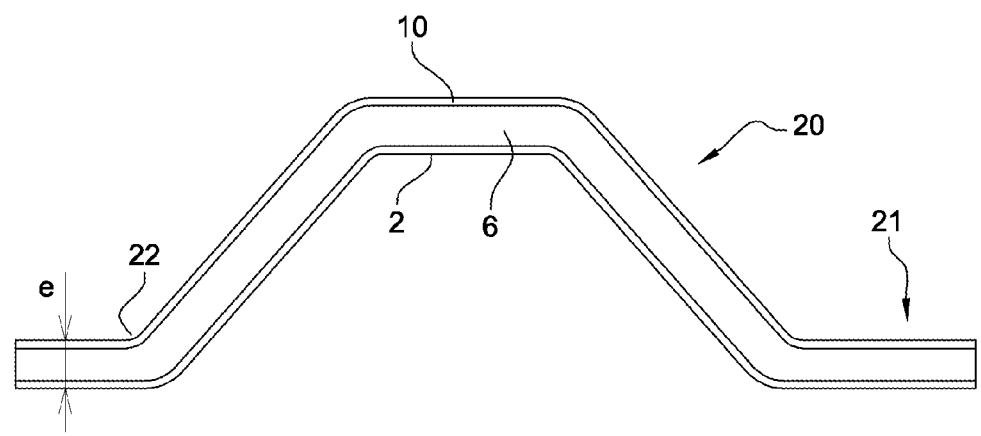
FIG. 2 is a cross-sectional view of a stack of FIG. 1 after it has been shaped and before it is cut as per the contours of the future membrane.

After it is shaped, and as illustrated in FIG. 2, the stack takes the desired form, which is typically that of a truncated cone, as shown in the illustration. Typically, the thickness (t) of the membrane, mainly influenced by the core layer (6), ranges from a few tenths of a millimeter to a few millimeters. The unit is then cut to the contour (22) of the membrane, typically at the junction between the truncated cone-shaped portion (20) and the peripheral flat portions (21) that are to be removed.

As already mentioned, it is also possible to manufacture the membrane pursuant to the invention by using pre-impregnated reinforcements. In this case, the excess resin present in the skins (2, 10) seeps into the core (6) during the pressurising stage.

It follows from the above that the membrane according to the invention has multiple advantages, a few of which are:

high rigidity due to a sandwich structure distancing the two outer skins;
satisfactory damping due to the use of oriented natural fibres;
a simple manufacturing process which allows the different layers to be assembled and shaped in one stage only;
the use of natural materials.

The invention claimed is:

1. Loudspeaker membrane with a sandwich structure, which comprises a central core separating two layers of materials made of high-rigidity yarn, impregnated with a polymerised resin, wherein the central core is formed of a material made of oriented natural fibres that are nearly parallel to each other and are impregnated with a polymer resin wherein the natural fibers are in the form of a unidirectional textile structure.

2. Membrane according to claim 1, wherein the outer layers comprise a textile made of high-rigidity yarn.

3. Membrane according to claim 1, wherein the high-rigidity yarn of the outer layers are made of a material selected from the group comprising glass, carbon and aramid, taken individually or in combination with each other.

4. Membrane according to claim 1, wherein the natural fibres are chosen from the group comprising flax, silk, hemp, ramie, coir, sisal, jute, bamboo and cotton, taken either individually or in combination with each other.

5. Membrane according to claim 1, wherein the resin impregnating the outer layers is of the thermosetting type.

6. Membrane according to claim 1, wherein the central core has a thickness that ranges from 0.3 to 3 millimeters.

7. Membrane according to claim 1, wherein the natural fibres are made of flax and wherein the outer layers are woven structures made of glass yarn.

8. A loudspeaker membrane sandwich structure comprising:
two high-rigidity yarn layers of a loudspeaker membrane sandwich structure, both of said two high-rigidity yarn layers impregnated with a polymerised resin;
a loudspeaker membrane sandwich structure central core of a substantially unidirectional oriented layer of natural fibres impregnated with a polymer resin, said central core disposed between and separating said two layers of materials made of high-rigidity yarn; and
wherein a surface of at least one of said two high-rigidity yarn layers defines an outer surface of said loudspeaker membrane sandwich structure which directly contacts and moves a mass of air.

* * * * *